United States Patent
Schumacher et al.

(10) Patent No.: US 7,534,409 B2
(45) Date of Patent: May 19, 2009

(54) PYROGENIC SILICON DIOXIDE POWDER AND DISPERSION THEREOF

(75) Inventors: Kai Schumacher, Hofheim (DE); Dieter Kerner, Hanau (DE)

(73) Assignee: Degussa AG, Duesseldorf (DE)

( * ) Notice: Subject to any disclaimer, the term of this patent is extended or adjusted under 35 U.S.C. 154(b) by 538 days.

(21) Appl. No.: 10/549,929

(22) PCT Filed: Mar. 15, 2004

(86) PCT No.: PCT/EP2004/002664

§ 371 (c)(1),
(2), (4) Date: Sep. 20, 2005

(87) PCT Pub. No.: WO2004/085311

PCT Pub. Date: Oct. 7, 2004

(65) Prior Publication Data

US 2006/0201647 A1     Sep. 14, 2006

(30) Foreign Application Priority Data

Mar. 24, 2003 (DE) ............................. 103 12 970

(51) Int. Cl.
*C01B 33/12* (2006.01)
(52) U.S. Cl. ................. 423/335; 423/324; 423/336; 423/337; 162/181.6; 162/181.4; 516/81; 524/588; 524/492
(58) Field of Classification Search ............... 162/181.6, 162/181.4; 423/335, 336; 516/81
See application file for complete search history.

(56) References Cited

U.S. PATENT DOCUMENTS 5,976,480 A * 11/1999 Mangold et al. ............ 423/336

2004/0253164 A1   12/2004 Mangold et al.

FOREIGN PATENT DOCUMENTS

| EP | 0 637 616 | 2/1995 |
| EP | 1 182 168 | 2/2002 |
| GB | 2044738 | * 10/1980 |
| JP | 2002-114510 | 4/2002 |

OTHER PUBLICATIONS

U.S. Appl. No. 11/055,605, filed Feb. 11, 2005, Schumacher, et al.
U.S. Appl. No. 11/084,022, filed Mar. 21, 2005, Schumacher, et al.
U.S. Appl. No. 11/084,170, filed Mar. 21, 2005, Schumacher, et al.
U.S. Appl. No. 11/085,151, filed Mar. 22, 2005, Schumacher, et al.
U.S. Appl. No. 10/524,037, filed Feb. 9, 2005, Schumacher, et al.
U.S. Appl. No. 10/530,284, filed Apr. 5, 2005, Moerters, et al.
U.S. Appl. No. 10/530,491, filed Apr. 6, 2005, Moerters, et al.

* cited by examiner

*Primary Examiner*—Mark Halpern
(74) *Attorney, Agent, or Firm*—Oblon, Spivak, McClelland, Maier & Neustadt, P.C.

(57) ABSTRACT

Pyrogenically produced silicon dioxide powder with a specific surface area of between 5 and 600 m²/g and a carbon content of less than 500 ppm, which displays a specific dibutyl phthalate absorption of less than or equal to 1.2 g dibutyl phthalate/100 g SiO2 per m² of specific surface area and a specific thickening action of less than 15 mPas/m² of specific surface area. It is produced by supplying vaporous tetramethoxysilane and/or tetraethoxysilane together with air and separately hydrogen to a burner, and allowing the mixture of gases to react in a flame in a reaction chamber connected in series to the burner, and separating the solid reaction product from the gas stream by known means, the lambda value in the burner being between 0.95 and 1.5 and sufficient secondary air also being supplied to the reaction chamber that the lambda value in the reaction chamber is between 0.8 and 1.6. The invention also provides a dispersion containing the silicon dioxide powder and the use of the powder and of the dispersion.

17 Claims, 1 Drawing Sheet

PYROGENIC SILICON DIOXIDE POWDER AND DISPERSION THEREOF

Figure 1:
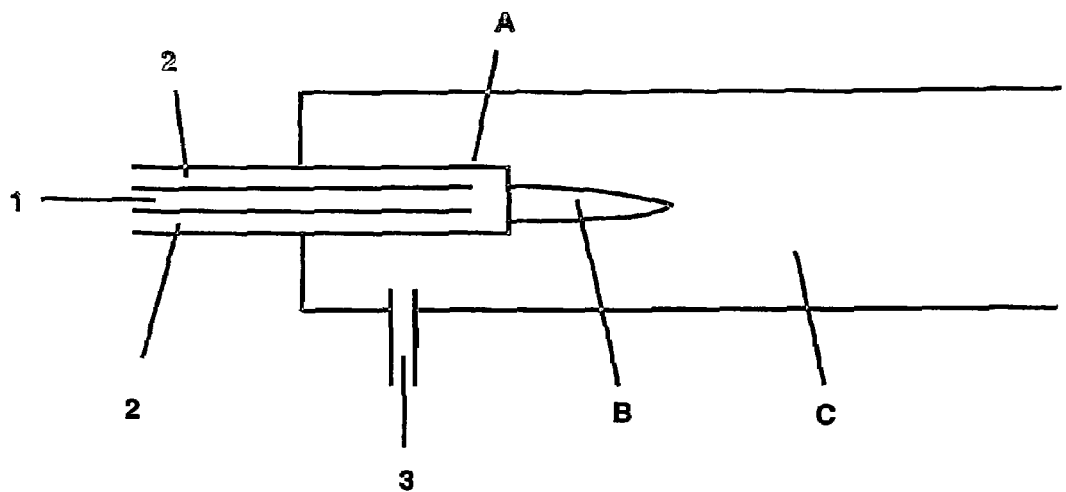

This application is a 371 of PCT/EP04/02664 filed on 15 Mar. 2004.

The invention provides a pyrogenically produced silicon dioxide powder, an aqueous dispersion containing this silicon dioxide powder, the production and use of the silicon dioxide powder and the dispersion.

The term pyrogenic silicon dioxide or pyrogenic silica (fumed silica) is a collective term for all highly disperse silicas obtained in the gas phase at elevated temperatures by coagulation of monomeric silica. There are two processes for the industrial production of pyrogenic silicas, high-temperature hydrolysis and the arc process.

In the high-temperature hydrolysis process a homogeneous mixture of a vaporous silicon compound, hydrogen, oxygen and an inert gas is burned with a burner in a cooled combustion space. Two reactions proceed side by side here. Firstly the reaction of hydrogen and oxygen with formation of water and secondly the hydrolysis of the silicon compound with formation of silicon dioxide.

The homogeneity of the gas mixture means that the reaction conditions and hence the formation and growth conditions are largely the same for each $SiO_2$ particle, such that very homogeneous and uniform particles can form. Air is used as the oxygen source in the known process. The pyrogenic silicas produced by the known process display specific surface areas of between 10 and 600 $m^2/g$.

The starting material for the silicon dioxide is generally silicon tetrachloride (cf. Ullmann's Encyclopedia of Industrial Chemistry, Vol. A23, pages 635 ff $5^{th}$ edition). In addition to silicon tetrachloride methyl trichlorosilane, trichlorosilane or mixtures thereof with silicon tetrachloride can also be used.

JP 2002114510 claims a process in which silicon dioxide is obtained with an average particle size of 0.05 to 5 μm. In this process silicon compounds are burned in the presence of oxygen and hydrogen. Siloxanes, silanes or silicon chlorides can be used as the silicon compound. However, the silicon dioxide produced by this process displays no properties that could not also be obtained by processes of the prior art. The process described is itself only of limited suitability for the production of larger quantities. A non-uniform product and, where carbon-containing silicon compounds are used as starting materials, dark products too are then to be expected in particular.

When used in dispersions such as are used in the production of glass articles or in chemical mechanical polishing in the semiconductor industry, the powder produced according to JP 2002114510 provides no advantages over the prior art.

Due to growing requirements an improvement in the properties of silicon dioxide is demanded in these very sectors. In the glass industry in particular, highly filled, readily manageable dispersions, in other words ones with low viscosity, are required because of their low shrinkage on drying and sintering.

The object of the invention is to provide a silicon dioxide powder which is suitable for the production of highly filled dispersions with low viscosity. The object of the invention is also to provide a stable dispersion containing this silicon-dioxide powder.

The invention provides a pyrogenically produced silicon dioxide powder having a specific surface area of between 5 and 600 $m^2/g$ and a carbon content of less than 500 ppm, which is characterised in that it displays a specific dibutyl phthalate absorption of less than or equal to 1.2 g dibutyl phthalate/100 g $SiO_2$ per $m^2$ of specific surface area and a specific thickening action of less than 15 mPas per $m^2$ of specific surface area.

The specific dibutyl phthalate absorption represents a measure of the structure of the silicon dioxide powder according to the invention as a function of its specific surface area. The term structure in this connection means the degree of intergrowth of the primary particles. These are initially formed in the pyrogenic process and as the reaction continues can coalesce to form chain-like aggregates, which in turn form agglomerates. The specific dibutyl phthalate absorption of less than or equal to 1.2 g dibutyl phthalate/100 g $SiO_2$ per $m^2$ of specific surface area claimed for the silicon dioxide powder according to the invention is generally lower than pyrogenic silicon dioxide powders obtained by the prior art.

The silicon dioxide powder according to the invention arises only in combination with a specific thickening action. This is understood to mean the thickening action per $m^2$ of specific surface area. The thickening action is determined in a dispersion of a silicon dioxide powder in a polyester.

In a preferred embodiment the powders according to the invention can display a specific compacted bulk density, defined as the product of the compacted bulk density and specific surface area, of between 1000 and 10000 and particularly preferably between 4000 and 7000 g/l×$m^2$ of specific surface area. Powders according to the invention displaying a specific compacted bulk density in this range can be incorporated especially readily into dispersions.

Furthermore, silicon dioxide powders according to the invention can preferably have a chloride content of less than 50 ppm, particularly preferably less than 20 ppm. The low chloride contents can for example demonstrate advantageous effects when the powders according to the invention are used in the area of chemical mechanical polishing.

The invention also provides a process for the production of silicon dioxide powder according to the invention which is characterised in that vaporous tetramethoxysilane (TMOS) and/or tetraethoxysilane (TEOS) together with air or with oxygen-enriched air and separately hydrogen are supplied to a burner, and the mixture of gases is allowed to react in a flame in a reaction chamber connected in series to the burner, and the solid reaction product is separated from the gas stream by known means, the lambda value in the burner being between 0.95 and 1.5 and sufficient secondary air also being supplied to the reaction chamber that the lambda value in the reaction chamber is between 0.8 and 1.6.

FIG. 1 shows a simplified process flow chart upon which the process according to the invention is based. A=burner; B=flame; C=reaction chamber;

1=supply of mixture comprising vaporous tetramethoxysilane and/or tetraethoxysilane together with air or with oxygen-enriched air; 2=supply of hydrogen; 3=supply of secondary air.

In the performance of the process it is substantial that a premixing of silane and air occurs, the stoichiometry of air/hydrogen and the oxygen component, expressed as the lambda value, being maintained in the burner and reaction chamber.

Lambda denotes the ratio of oxygen supplied to the burner or the reaction chamber to stoichiometrically required oxygen, which is needed to convert the silane compound completely to silicon dioxide. The lambda value range that must be maintained in the reaction chamber likewise refers to the total amount of the silane to be hydrolysed.

In the process according to the invention the volume ratio of oxygen/hydrogen in the burner can be varied between 0.2 and 2.8. In a particularly preferred embodiment the volume ratio of oxygen/hydrogen in the burner is between 0.9 and 1.4.

Depending on the desired specific surface area, it can be useful to vary the streams supplied to the burner and the burner geometry in such a way that the discharge velocity of the gases leaving the burner is at least 10 $ms^{-1}$. Discharge velocities of at least 20 $ms^{-1}$ are particularly preferred.

The invention also provides an aqueous dispersion containing the silicon dioxide powder according to the invention.

The aqueous dispersion according to the invention can display a content of silicon dioxide powder of between 20 and 80 wt. %. Dispersions having a content of silicon dioxide powder of between 40 and 60 can be particularly preferred. These dispersions display a particularly high stability with a comparatively low structure.

The aqueous dispersion according to the invention can preferably display an average particle size in the aggregates of silicon dioxide powder which is less than 200 nm. For certain applications such as e.g. the chemical mechanical polishing of semiconductor substrates, a value of less than 150 nm can be particularly preferred.

The dispersion according to the invention can be stabilised by the addition of bases or cationic polymers or aluminium salts or a mixture of cationic polymers and aluminium salts or acids.

Bases that can be used are ammonia, ammonium hydroxide, tetramethyl ammonium hydroxide, primary, secondary or tertiary organic amines, sodium hydroxide solution or potassium hydroxide solution.

Cationic polymers that can be used are examples having at least one quaternary ammonium group, phosphonium group, an acid adduct of a primary, secondary or tertiary amine group, polyethylene imines, polydiallylamines or polyallylamines, polyvinylamines, dicyandiamide condensates, dicyandiamide-polyamine cocondensates or polyamide-formaldehyde condensates.

Aluminium salts that can be used are aluminium chloride, aluminium hydroxychlorides having the general formula $Al(OH)_xCl$ where x=2-8, aluminium chlorate, aluminium sulfate, aluminium nitrate, aluminium hydroxynitrates having the general formula $Al(OH)_xNO_3$ where x=2-8, aluminium acetate, alums such as aluminium potassium sulfate or aluminium ammonium sulfate, aluminium formate, aluminium lactate, aluminium oxide, aluminium hydroxide acetate, aluminium isopropylate, aluminium hydroxide, aluminium silicates and mixtures of the aforementioned compounds.

Inorganic acids, organic acids or mixtures of the aforementioned can be used as acids.

In particular, phosphoric acid, phosphorous acid, nitric acid; sulfuric acid, mixtures thereof and their acid-reacting salts can be used as inorganic acids.

Organic acids that are preferably used are carboxylic acids having the general formula $C_nH_{2n+1}CO_2H$, where n=0-6 or n=8, 10, 12, 14, 16, or dicarboxylic acids having the general formula $HO_2C(CH_2)_nCO_2H$, where n=0-4, or hydroxycarboxylic acids having the general formula $R_1R_2C(OH)CO_2H$, where $R_1$=H, $R_2$=$CH_3$, $CH_2CO_2H$, $CH(OH)CO_2H$, or phthalic acid or salicylic acid, or acid-reacting salts of the aforementioned acids or mixtures of the aforementioned acids and salts thereof.

Stabilisation of the dispersion according to the invention with tetramethyl ammonium hydroxide or aluminium hydroxychloride in an acid medium can be particularly advantageous.

The dispersion can optionally also contain other additives. These can for example be oxidising agents such as hydrogen peroxide or per-acids, oxidation activators whose purpose is to increase the rate of oxidation, corrosion inhibitors such as e.g. benzotriazole. Surface-active substances of a non-ionic, cationic, anionic or amphoteric nature can also be added to the dispersion according to the invention.

The invention also provides a process for the production of the dispersion according to the invention, which is characterised in that the silicon dioxide powder according to the invention is incorporated with a dispersing device into water, which can be stabilised by the addition of bases or cationic polymers or aluminium salts or a mixture of cationic polymers and aluminium salts or acids, and is then dispersed further for a period of 5 to 30 minutes.

There is no restriction on the type of dispersing device. It can be advantageous however, especially for the production of highly filled dispersions, to use dispersing devices with a high energy input. These can for example be rotor-stator systems, planetary compounders or high-energy mills. In the latter, two predispersed streams of suspension under high pressure are decompressed through a nozzle. The two jets of dispersion hit each other exactly and the particles grind themselves. In another embodiment the predispersion is likewise placed under high pressure, but the particles collide against armoured sections of wall. A rotor-stator system can preferably be used to produce the dispersion according to the invention.

The invention also provides the use of the silicon dioxide powder according to the invention as a filler in rubber, silicone rubber and plastics, to adjust the rheology in paints and coatings and as a support for catalysts.

The invention also provides the use of the dispersion according to the invention for the production of glass articles, for chemical mechanical polishing and for the production of inkjet papers.

EXAMPLES

Analytical Determinations

The specific surface area of the powders is determined in accordance with DIN 66131.

The dibutyl phthalate absorption is measured with a RHEOCORD 90 device supplied by Haake, Karlsruhe. To this end 8 g of the silicon dioxide powder is introduced into a mixing chamber with an accuracy of 0.001 g, the chamber is closed with a lid and dibutyl phthalate is metered in through a hole in the lid at a predefined feed rate of 0.0667 ml/s. The compounder is operated at a motor speed of 125 revolutions per minute. On reaching the maximum torque the compounder and DBP metering are automatically switched off. The DBP absorption is calculated from the consumed amount of DBP and the weighed amount of particles according to the formula below:

$$DBP \text{ value } (g/100 \text{ g}) = (DBP \text{ consumption in } g/\text{weighed amount of particles in g}) \times 100.$$

The thickening action is determined by the following method: 7.5 g silicon dioxide powder are introduced into 142.5 g of a solution of an unsaturated polyester resin in styrene with a viscosity of 1300+/−100 mPas at a temperature of 22° C. and dispersed by means of a high-speed mixer at 3000 $min^{-1}$. A suitable example of an unsaturated polyester resin is Ludopal® P6, BASF. A further 90 g of the unsaturated polyester resin in styrene are added to 60 g of this dispersion and the dispersion process is repeated. The thickening action is taken to be the viscosity value in mPas of the dispersion at 25° C., measured with a rotary viscometer at a shear rate of 2.7 s$^{-1}$.

The chloride content of the silicon dioxide powder is determined by the following procedure: Approximately 0.3 g of the particles according to the invention are weighed in accurately, topped up with 20 ml of 20 percent reagent-grade sodium hydroxide solution, dissolved and transferred into 15 ml cooled $HNO_3$ whilst being stirred. The chloride content in the solution is titrated with $AgNO_3$ solution (0.1 mol/l or 0.01 mol/l).

The carbon content of the silicon dioxide powder is determined by the following procedure: Approximately 100 to 1000 mg of the particles according to the invention are weighed accurately into a crucible, combined with 1 g each of ultrapure iron and aggregate (LECOCELL II) and burned in a carbon analyser (LECO) at approx. 1800° C. with the aid of oxygen. The $CO_2$ that is generated is measured by IR and the content calculated therefrom.

The compacted bulk density is determined by reference to DIN ISO 787/XI K 5101/18 (not screened).

The pH is determined by reference to DIN ISO 787/IX, ASTM D 1280, JIS K 5101/24.

The viscosity of the dispersions is determined with a Physica Model 300 rotary rheometer and a CC 27 measuring beaker at 25° C. The viscosity value is determined at a shear rate of 10 1/sec. This shear rate is in a range in which the viscosity of the dispersions formed is virtually independent of the shear stress.

The particle size prevailing in the dispersion is determined by means of dynamic light scattering. A Zetasizer 3000 HSa (Malvern Instruments, UK) is used. The volume-weighted median value of the peak analysis is stated.

Example 1

1.5 kg/h tetramethoxysilane are evaporated at 180° C. and introduced into the central pipe of the burner. 12 m³/h of air are additionally introduced into the central pipe. 1.8 m³/h of hydrogen are fed into a pipe surrounding the central pipe. The gas mixture burns in the reaction chamber, into which 17 m³/h of secondary air are additionally introduced.

The reaction gases and the silicon dioxide that is formed are drawn through a cooling system by application of a partial vacuum, cooling them to values between 100 and 160° C. The solid is separated from the waste gas stream in a filter or cyclone.

The analytical data for the silicon dioxide powder obtained is reproduced in Table 2.

Examples 2 to 9 and comparative examples 10 and 11 were performed in the same way.

In comparative examples 12 to 14 silicon tetrachloride is used in place of tetramethoxysilane. In these experiments, following separation from the waste gas stream the silicon dioxide powder is treated at elevated temperature with water vapour-containing air to remove adhering hydrochloric acid residues.

The physical-chemical data for the silicon dioxide powders obtained is reproduced in Table 2.

Examples 1 to 9 lead to the silicon dioxide powders according to the invention having a low structure, expressed as the specific DBP value, a low specific thickening action and a high specific compacted bulk density.

Examples 10 and 11 show that only the process according to the invention leads to these powders. Reducing the secondary air or even omitting it altogether or increasing the burner air does not lead to the silicon dioxide powders according to the invention.

In the same way, using silicon tetrachloride, examples 12 to 14, whilst maintaining the conditions with regard to the lambda value in the burner and in the reaction chamber, does not lead to the silicon dioxide powders according to the invention.

Example 15

Production of a Dispersion in the Acid pH Range 36 kg of demineralised water are placed in a 60 l stainless steel batch container. 6.4 kg of the pyrogenically produced silicon dioxide are then drawn in under shear conditions using the suction pipe of the Ystral Conti-TDS 3 and on completion of the drawing-in process shearing is continued for a further 15 min at 3000 rpm.

Example 16

Production of a Dispersion in the Alkaline pH Range 35.5 kg of demineralised water and 52 g of a 30% KOH solution are placed in a 60 stainless steel batch container. 6.4 kg of the pyrogenically produced silicon dioxide are then drawn in under shear conditions using the suction pipe of the Ystral-Conti-TDS 3 and on completion of the drawing-in process shearing is continued for a further 15 min at 3000 rpm. During this 15-minute dispersion the pH is adjusted to and held at a pH of 10.4 by addition of further KOH solution. A further 43 g of KOH solution were used in this process and a solids concentration of 15 wt. % established by addition of 0.4 kg water.

Example 17

Production of a Dispersion in the Presence of Aluminium Salts 35 kg of demineralised water are placed in a 60 l stainless steel batch container. 6.4 kg of the pyrogenically produced silicon dioxide are then drawn in under shear conditions using the suction pipe of the Ystral Conti-TDS 3. 640 g of a 1 wt. % solution (relative to aluminium oxide) of aluminium chloride are then added with dispersion and on completion of the addition shearing is continued for a further 15 min at 3000 rpm. 0.1 kg demineralised water and 305 g 1 N NaOH are then added to obtain a 15 wt. % dispersion with a pH of 3.5.

Example 18

Production of a Dispersion of Aerosil 90
(Comparative Example)

35.5 kg of demineralised water and 52 g of a 30% KOH solution are placed in a 60 l stainless steel batch container. 5.2 kg of AEROSIL® 90 are then drawn in under shear conditions using the suction pipe of the Ystral Conti-TDS 3 and on completion of the drawing-in process shearing is continued for a further 15 min at 3000 rpm. During this 15-minute dispersion the pH is adjusted to and held at a pH of 10.4 by addition of further KOH solution. A further 63 g of KOH solution were used in this process and a solids concentration of 15 wt. % established by addition of 0.6 kg water.

The physical-chemical parameters for the dispersions are reproduced in Table 3.

TABLE 3

Physical-chemical data for the dispersions

| Ex. | SiO$_2$ | Concentration [wt. %] | pH | Average particle size [nm] | Viscosity (10 s$^{-1}$) [mPas] |
|---|---|---|---|---|---|
| 15 | From ex. 7 | 15 | 3.7 | 101 | 4.1 |
| 16 | From ex. 7 | 15 | 10.4 | 103 | 1.9 |
| 17 | From ex. 7 | 15 | 3.5 | 107 | 2.4 |
| 18 | Aerosil 90* | 12.5 | 10.4 | 198 | 3.5 |

*Pyrogenically produced silicon dioxide from Degussa AG, BET surface area approx. 90 m$^2$/g.

Example 19

Dispersion with High Solids Content 35.5 kg of demineralised water in a 60 l stainless steel batch container are adjusted to a pH of 11 with tetramethyl ammonium hydroxide solution (25%). 37 kg of the pyrogenically produced silicon dioxide are then drawn in under shear conditions using the suction pipe of the Ystral Conti-TDS 3 and on completion of the drawing-in process shearing is continued for a further 15 min at 3000 rpm. During this 15-minute dispersion the pH is held at a pH of between 10 and 11 by addition of tetramethyl ammonium hydroxide solution. A solids concentration of 50 wt. % is established by addition of the remaining amount of water that is needed.

The resulting dispersion has a silicon dioxide content of 50 wt. % and a pH of 10.3. It displays a viscosity, determined with a Physica viscometer, of 2450 mPas. The average particle size is 116 nm. The dispersion displays no thickening or sedimentation even after a storage period of 6 months.

The silicon dioxide powders according to the invention are characterised by an ability to be incorporated rapidly into aqueous media.

In comparison to dispersions with the known silicon dioxide powder, the dispersions according to the invention display more favourable values for viscosity and smaller particle sizes.

Example 19 shows that dispersions with a high solids content can also be produced. Under similar conditions the use of known silicon dioxide powders with a comparable BET surface area leads to gel-like compositions, or the powder cannot be incorporated fully.

TABLE 1

Amounts used and settings from examples 1 to 14

| Example | TMOS [kg/h] | H$_2$ burner [m$^3$/h] | Air burner [m$^3$/h] | Secondary air [m$^3$/h] | Lambda burner | Lambda reaction chamber | O$_2$/H$_2$ burner | v* [m/s] |
|---|---|---|---|---|---|---|---|---|
| 1 | 1.5 | 1.8 | 12 | 17 | 1.11 | 2.32 | 1.4 | 30.0 |
| 2 | 1.5 | 2.3 | 12 | 17 | 1.01 | 2.09 | 1.1 | 31.0 |
| 3 | 1.5 | 3.4 | 14.8 | 17 | 1.02 | 1.96 | 0.9 | 39.1 |
| 4 | 1.5 | 2.4 | 14.8 | 17 | 1.19 | 2.27 | 1.3 | 37.0 |
| 5 | 1.5 | 3 | 14.8 | 17 | 1.08 | 2.07 | 1.0 | 38.2 |
| 6 | 1.5 | 2.4 | 12 | 17 | 1.00 | 1.88 | 1.1 | 31.2 |
| 7 | 1.5 | 2.4 | 12 | 17 | 1.00 | 1.83 | 1.1 | 31.2 |
| 8 | 1.5 | 2.4 | 12 | 17 | 1.00 | 2.09 | 1.1 | 31.2 |
| 9 | 1.5 | 1.8 | 12 | 17 | 1.11 | 2.31 | 1.4 | 30.0 |
| Comp. ex. | | | | | | | | |
| 10 | 1.5 | 1.8 | 12 | 0 | 1.11 | 1.05 | 1.4 | 30.0 |
| 11 | 1.5 | 1.8 | 12 | 5 | 1.11 | 1.05 | 1.4 | 30.0 |
| 12** | 4.4 | 2 | 5.8 | 17 | 1.21 | 3.79 | 0.61 | 17.6 |
| 13 | 4.4 | 2 | 5.2 | 17 | 1.09 | 3.68 | 0.55 | 16.3 |
| 14 | 4.4 | 2.3 | 5.5 | 17 | 1 | 3.30 | 0.50 | 17.6 |

*Discharge velocity from burner;
**2 to 14: SiCl$_4$ in place of TMOS

TABLE 2

Physical-chemical values of the silicon dioxide powders from examples 1 to 14

| Example | BET [m$^2$/g] | DBP number [g/100 g] | Spec. DBP number [g/100 g]/[m$^2$/g] | Thickening [mPas] | Spec. thickening [mPas]/[m$^2$/g] | Comp. bulk density [g/l] | Spec. comp. bulk density [g/l] × [m$^2$/g] | pH | C μg/g | Cl μg/g |
|---|---|---|---|---|---|---|---|---|---|---|
| 1 | 200 | 225 | 1.1 | 1920 | 9.6 | 24 | 4800 | 4.24 | <100 | <13 |
| 2 | 129 | 146 | 1.1 | 770 | 5.9 | 35 | 4515 | 4.36 | <100 | <10 |
| 3 | 163 | 98 | 0.6 | 830 | 5.1 | 30 | 4890 | 4.38 | <100 | <10 |
| 4 | 330 | 314 | 1.0 | 2220 | 6.7 | 19 | 6270 | 3.98 | <100 | <10 |

TABLE 2-continued

Physical-chemical values of the silicon dioxide powders from examples 1 to 14

| | BET [m²/g] | DBP number [g/100 g] | Spec. DBP number [g/100 g]/[m²/g] | Thickening [mPas] | Spec. thickening [mPas]/[m²/g] | Comp. bulk density [g/l] | Spec. comp. bulk density [g/l] × [m²/g] | pH | C µg/g | Cl µg/g |
|---|---|---|---|---|---|---|---|---|---|---|
| 5 | 196 | 125 | 0.6 | 1650 | 8.4 | 26 | 5096 | 4.05 | <100 | <13 |
| 6 | 109 | 74 | 0.7 | 690 | 6.3 | 42 | 4578 | 4.53 | <100 | <10 |
| 7 | 99 | 110 | 1.1 | 1325 | 13.4 | 50 | 4950 | 4.22 | <100 | <10 |
| 8 | 130 | 95 | 0.7 | 740 | 5.7 | 35 | 4550 | 4.13 | <100 | <10 |
| 9 | 191 | 191 | 1.0 | 1590 | 8.3 | 21 | 4011 | 4.00 | <100 | <14 |
| Comp. ex. | | | | | | | | | | |
| 10 | 205 | 320 | 1.6 | 3100 | 15.1 | n.d.* | n.d. | 4.11 | <100 | <13 |
| 11 | 198 | 280 | 1.4 | 3050 | 15.4 | n.d. | n.d. | 4.09 | <100 | <10 |
| 12 | 199 | 346 | 1.7 | 3230 | 16.2 | 17 | 3383 | 4.09 | <100 | 80 |
| 13 | 131 | 309 | 2.4 | 1880 | 14.4 | 19 | 2489 | 4.17 | <100 | 44 |
| 14 | 91 | 233 | 2.6 | 2805 | 30.8 | 24 | 2184 | 4.23 | <100 | 83 |

*n.d. = not determined

The invention claimed is:

1. A pyrogenically produced silicon dioxide powder having the following characteristics:
   a specific surface area of between 5 and 600 m²/g;
   a specific dibutyl phthalate absorption of less than or equal to 1.2 g dibutyl phthalate/100 g SiO₂ per m² of specific surface area;
   and a specific thickening effect of less than 15 mPas per m² of specific surface area,
   wherein said powder has a carbon content of less than 500 ppm and a chloride content of less than 20 ppm.

2. The pyrogenically produced silicon dioxide powder according to claim 1, wherein a specific compacted bulk density is between 1000 and 10000 g/l ×m² of specific surface area.

3. A process for making the silicon dioxide powder according to claim 1, comprising:
   premixing and supplying vaporous tetramethoxysilane, tetraethoxysilane, or a combination thereof with air or with oxygen-enriched air to a burner present in a reaction chamber;
   separately supplying hydrogen to said burner to form a mixture with said tetramethoxysilane, tetraethoxysilane, or combination thereof;
   introducing secondary air to said reaction chamber;
   reacting said mixture in a flame of said burner; and
   separating solid reaction product from a gas stream,
   wherein a lambda value in said burner is from 0.95 to 1.5, and a lambda value for said secondary air is from 0.8 to 1.6.

4. The process according to claim 3, wherein a volume ratio of oxygen/hydrogen in the burner is between 0.2 and 2.8.

5. The process according to claim 3, wherein a discharge velocity of the gases leaving the burner is at least 10 ms⁻¹.

6. An aqueous dispersion comprising water and the pyrogenically produced silicon dioxide powder according to claim 1.

7. The aqueous dispersion according to claim 6, wherein a content of silicon dioxide powder in the dispersion is between 20 and 80wt %.

8. The aqueous dispersion according to claim 6, wherein an average aggregate diameter in the dispersion is less than 200 nm.

9. The aqueous dispersion according to claim 6, wherein the aqueous dispersion further comprises an additive selected from the group consisting of an oxidizing agent, a per-acid, an oxidation activator, a corrosion inhibitor, or a surfactant.

10. The aqueous dispersion according to claim 9, wherein said additive is hydrogen peroxide or benzotriazole.

11. A process for the production of the aqueous dispersion according to claim 6, comprising:
   incorporating said pyrogenically produced silicon dioxide powder with a dispersing device into water, and
   stabilizing said aqueous dispersion by adding at least one of a base, a cationic polymer, an aluminium salt, a mixture of a cationic polymer and an aluminium salt, or an acid to form a stabilized aqueous dispersion.

12. The process according to claim 11, wherein said stabilizing occurs in the presence of tetramethyl ammonium hydroxide or aluminium hydroxychloride in an acid medium.

13. The process according to claim 11, further comprising dispersing said stabilized aqueous dispersion for a period of 5 to 30 minutes.

14. The process according to claim 11, wherein said dispersing device is a rotor-stator system, a planetary compounder, or a high-energy mill.

15. The aqueous dispersion according to claim 6, where a content of silicon dioxide powder in the dispersion is between 40 and 60 wt %.

16. A rubber, a silicone rubber, a plastic or a paper comprising the silicon dioxide powder according to claim 1 as a filler.

17. The pyrogenically produced silicon dioxide powder according to claim 1, wherein the chloride content is less than 14 ppm.

* * * * *